United States Patent
Murari et al.

(10) Patent No.: US 10,552,798 B2
(45) Date of Patent: Feb. 4, 2020

(54) ABSTRACTION SERVICES FOR PRODUCTIVITY SERVERS

(71) Applicant: SAP SE, Walldorf (DE)

(72) Inventors: Rama Sulakshani Murari, Bangalore (IN); Nitin Verma, Bangalore (IN); Showkath Ali Naseem, Bangalore (IN)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 15/628,948

(22) Filed: Jun. 21, 2017

(65) Prior Publication Data

US 2018/0374050 A1 Dec. 27, 2018

(51) Int. Cl.
| | | |
|---|---|---|
| *G06Q 10/10* | (2012.01) | |
| *H04L 29/08* | (2006.01) | |
| *H04L 12/58* | (2006.01) | |

(52) U.S. Cl.
CPC ......... *G06Q 10/103* (2013.01); *G06Q 10/107* (2013.01); *G06Q 10/109* (2013.01); *H04L 67/2823* (2013.01); *H04L 67/2838* (2013.01); *G06Q 10/10* (2013.01); *H04L 51/046* (2013.01); *H04L 51/36* (2013.01); *H04L 67/28* (2013.01)

(58) Field of Classification Search
CPC .... G06Q 10/10; G06Q 10/103; G06Q 10/107; G06Q 10/109; H04L 51/00; H04L 51/04; H04L 51/046; H04L 51/36; H04L 67/28; H04L 67/2823; H04L 67/2838
See application file for complete search history.

(56) References Cited

U.S. PATENT DOCUMENTS

| | | | |
|---|---|---|---|
| 9,921,894 B1* | 3/2018 | O'Kennedy | ........ H04L 67/2823 |
| 2003/0105887 A1* | 6/2003 | Cox | .......................... G06F 8/20 |
| | | | 719/328 |
| 2004/0107256 A1* | 6/2004 | Odenwald | ............ G06Q 10/107 |
| | | | 709/205 |
| 2004/0174392 A1* | 9/2004 | Bjoernsen | .............. G06Q 10/10 |
| | | | 715/751 |

(Continued)

OTHER PUBLICATIONS

N. Jeners, S. Budweg and W. Prinz, "Portal modules for Groupware systems," 2009 5th International Conference on Collaborative Computing: Networking, Applications and Worksharing, Washington, DC, 2009, pp. 1-10 (Year: 2009).*

(Continued)

*Primary Examiner* — Normin Abedin
*Assistant Examiner* — William C McBeth
(74) *Attorney, Agent, or Firm* — Buckley, Maschoff & Talwalkar LLC

(57) ABSTRACT

A method and system including a display; a memory storing processor-executable steps; a Productivity Integration Hub (PIH) module; and a processor to execute the processor-executable process steps to cause the system to: present a user interface on the display, the user interface associated with an end-user application and including one or more user-entry fields to receive data to request a service; receive input data in the one or more displayed user-entry fields; receive the input data at the PIH module; access a productivity server via the PIH module; return one or more response details to the PIH module from the productivity server; and display on the user interface at least one of the one or more response details received from the PIH module. Numerous other aspects are provided.

13 Claims, 8 Drawing Sheets

(56) References Cited

U.S. PATENT DOCUMENTS

| | | | | |
|---|---|---|---|---|
| 2005/0038915 A1* | 2/2005 | Clarke | ............... | H04L 67/28 709/250 |
| 2005/0289202 A1* | 12/2005 | S | ............... | G06Q 10/109 708/112 |
| 2008/0086527 A1* | 4/2008 | Sposetti | ............... | G06Q 10/10 709/204 |
| 2008/0126486 A1* | 5/2008 | Heist | ............... | G06O 10/10 709/205 |
| 2010/0174789 A1* | 7/2010 | Pena | ............... | H04L 67/2861 709/206 |
| 2011/0137929 A1* | 6/2011 | Lehmann | ............... | G06Q 10/109 707/769 |
| 2015/0143258 A1* | 5/2015 | Carolan | ............... | H04L 51/18 715/752 |
| 2018/0176207 A1* | 6/2018 | Malatesha | ............... | G06Q 10/10 |
| 2018/0276053 A1* | 9/2018 | Kesavan | ............... | H04L 67/16 |

OTHER PUBLICATIONS

J. Buford, K. Mahajan and V. Krishnaswamy, "Federated enterprise and cloud-based collaboration services," 2011 IEEE 5th International Conference on Internet Multimedia Systems Architecture and Application, Bangalore, 2011, pp. 1-6. (Year: 2011).*

* cited by examiner

400

401

404

Create Connection

406 — *Connection Name: [Connection Name]
408 — Calendar Server: [Office 365 ▼]
410 — *Authentication Type: [OAuth Authentication ▼]
412 — *Supported Domains: [Domain name separated by comma]
414 — *Client Id: [ ]
416 — *Authority: [ ]
418 — *URL: [ ]
420 — *Certificate Alias: [ ]
422 — *Keystore Location: [ ▼]
Upload and delete certificates
424 — *Keystore Password: [ ]

[Save] Cancel
426   428

FIG. 4

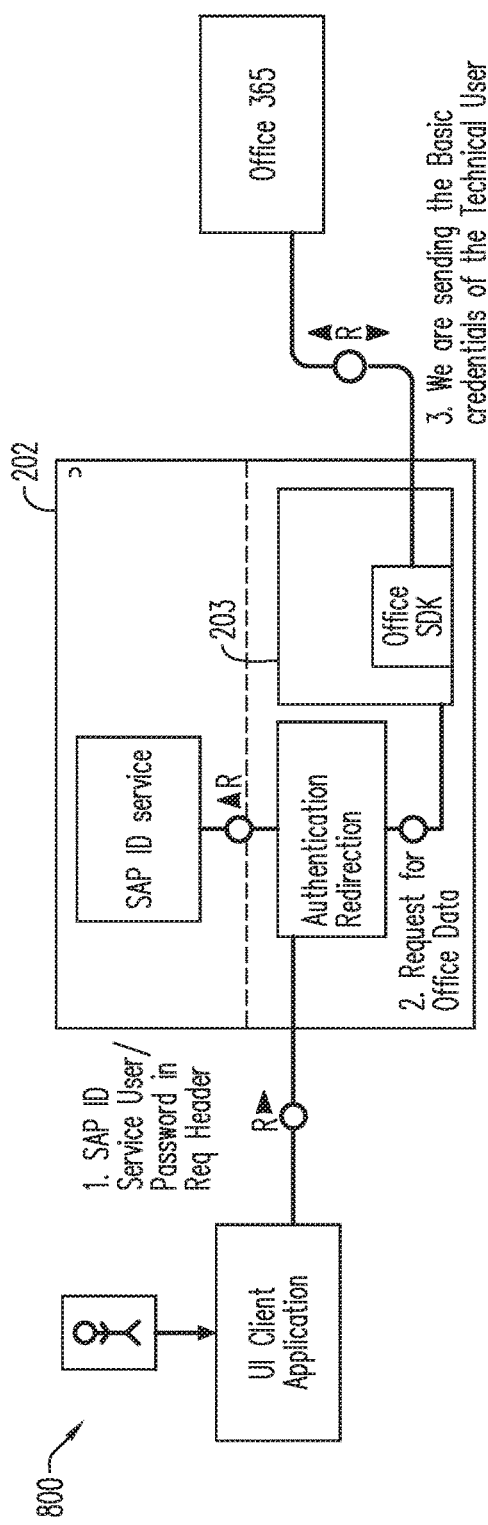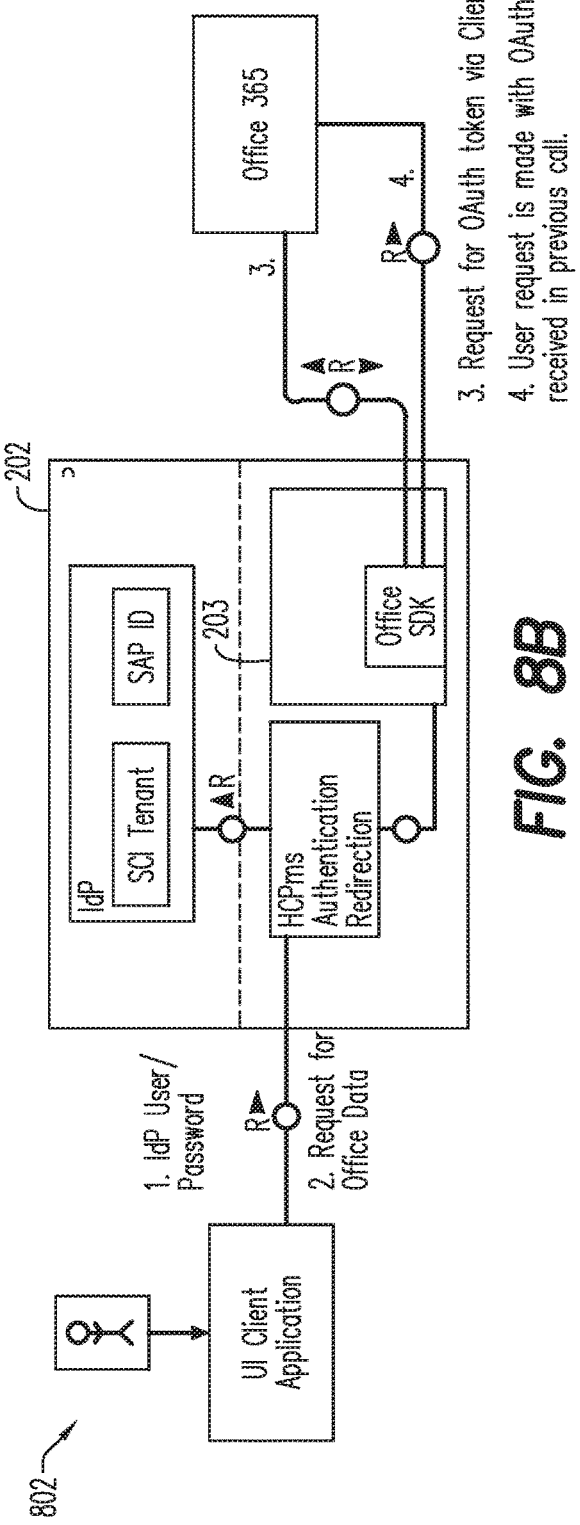

US 10,552,798 B2

ABSTRACTION SERVICES FOR PRODUCTIVITY SERVERS

BACKGROUND

A productivity service is a type of software service that helps end-users collaborate while located remotely from each other. Examples include electronic calendars, email-handling and meeting creation and management. A productivity service may be provided by a productivity server. However, end-users may use different productivity services provided by different productivity servers (e.g., Person A uses Gmail from Google, while Person B uses OUTLOOK® from MICROSOFT), which limits the end-users' ability to collaborate. Integration of these multiple services by one single application is possible but cumbersome, and requires proficiency with each productivity server's Software Development Kit (SDK).

Systems and methods are desired which support integration of these services.

BRIEF DESCRIPTION OF THE DRAWINGS

FIG. 4 is an outward view of a graphical interface according to some embodiments.

FIGS. 8A and 8B are SSO flows according to some embodiments.

DETAILED DESCRIPTION

Figure 1:
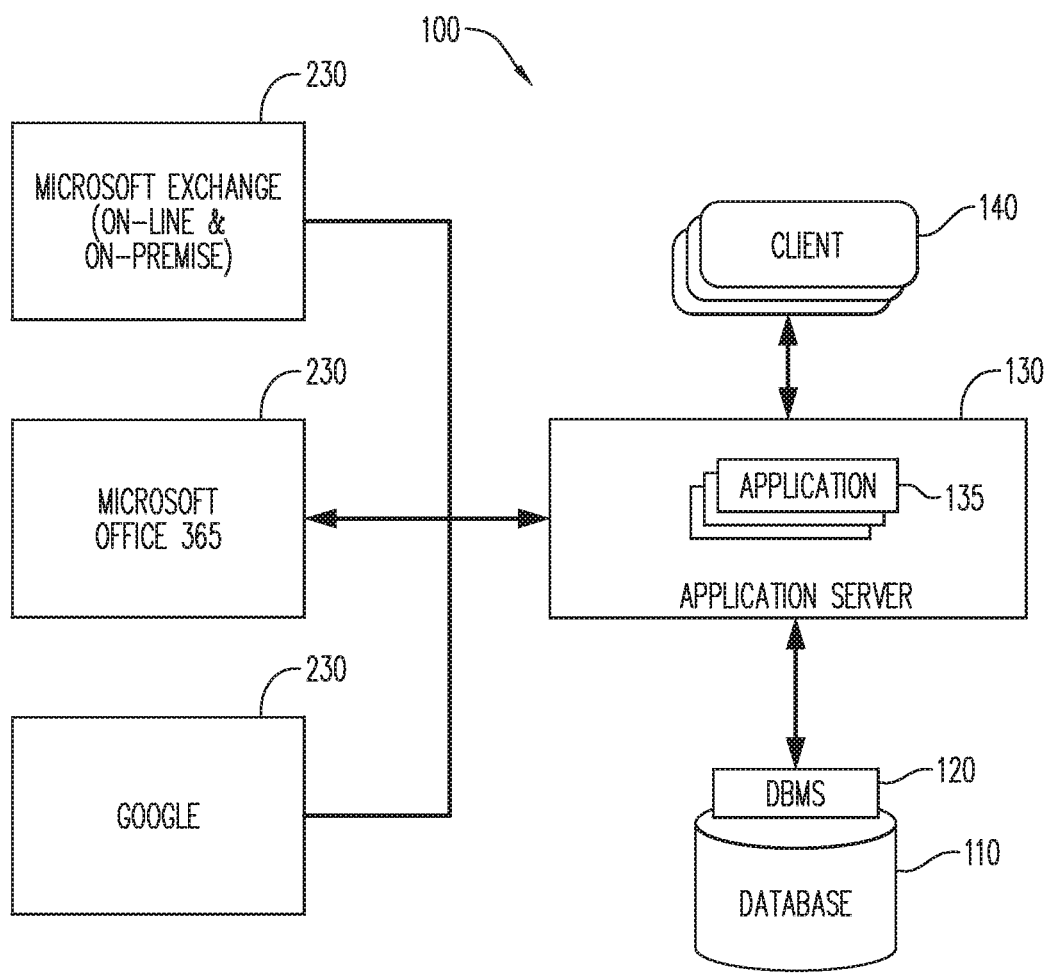
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In one or more embodiments a Productivity Integration Hub (PIH) module may provide the end-user with the ability to seamlessly connect to various servers. The PIH module may act as an integration hub or single point of contact to these productivity servers for an end-user. In one or more embodiments, the end-user application may contact the PIH module with an appropriate request payload to perform a productivity service (e.g., meeting, mail, calendar, chat). In one or more embodiments, instead of the application executing authorization, authentication and connectivity to the backend server to fetch the response for the productivity service, the PIH module executes authorization, authentication, single sign-on (SSO) and abstraction.

In one or more embodiments, abstraction may be provided by providing a common Application Program Interface (API) to the end-user in the form of a user interface (UI) based on an end-user request. When the PIH module receives request data entered via the API, the PIH module may map and transmit the request data to an appropriate productivity server based on a request type (e.g., meeting request) and an indicator associated with the end-user (e.g., email address). In one or more embodiments, when the end-user logs into the application, the authentication data may be passed on to the PIH module, and then in turn passed onto the productivity server, so the end-user only has to enter his credentials the one time when logging in to the application.

Embodiments enable applications to consume data and services from any (both cloud and on-premise) productivity server (e.g., MSFT, GOGLE, etc.), and for the productivity server to consume data and applications. Embodiments also provide the use of a generic "proxy" that allows applications to consume productivity data without the need to deal with SSO, user-mapping, security, etc. For example, as shown in FIGS. 8A and 8B, a high level flow for SSO is provided with respect to Office 365. The inventors note that a similar or same SSO flow will hold for other productivity servers. FIG. 8A shows an SSO flow 800 where a first step is the user ID and password being sent to the platform 202, and in particular to the authentication element of the core services. The core services then requests data from the mobile services 203. The mobile services has the PIH module use the SDK of the productivity server to send the basic credentials of the end user to the productivity server (e.g., Office 365) to obtain access. FIG. 8B shows the SSO flow 802 for an OAuth authentication process. The request for data is sent with the user ID and password to the authentication element of the core process. The request is then sent to the mobile services 203, who in turn sends a request for an OAuth token via a client credential flow to the productivity server (e.g., Office 365). The OAuth token is then returned to the mobile services, and the user request to access the productivity server is made with the OAuth token. The inventors also note that the common API provided to the end user allows for the development of server-independent applications (e.g., the application developer can "write code once and run with different servers"). In one or more embodiments, the Software Development Kit (SDK) of each productivity server is used to connect to the service. The inventors note that a benefit of using the SDK to connect is that the PIH module may upgrade the SDK versions, without the need for the application developers to do it.

Some embodiments may include an application ("app"). As used herein, the term "app" refers to a self-contained program or piece of software designed to fulfill a particular purpose.

FIG. 1 is a block diagram of system architecture 100 according to some embodiments. Embodiments are not limited to architecture 100 or to a three-tier database architecture.

Figure 2:
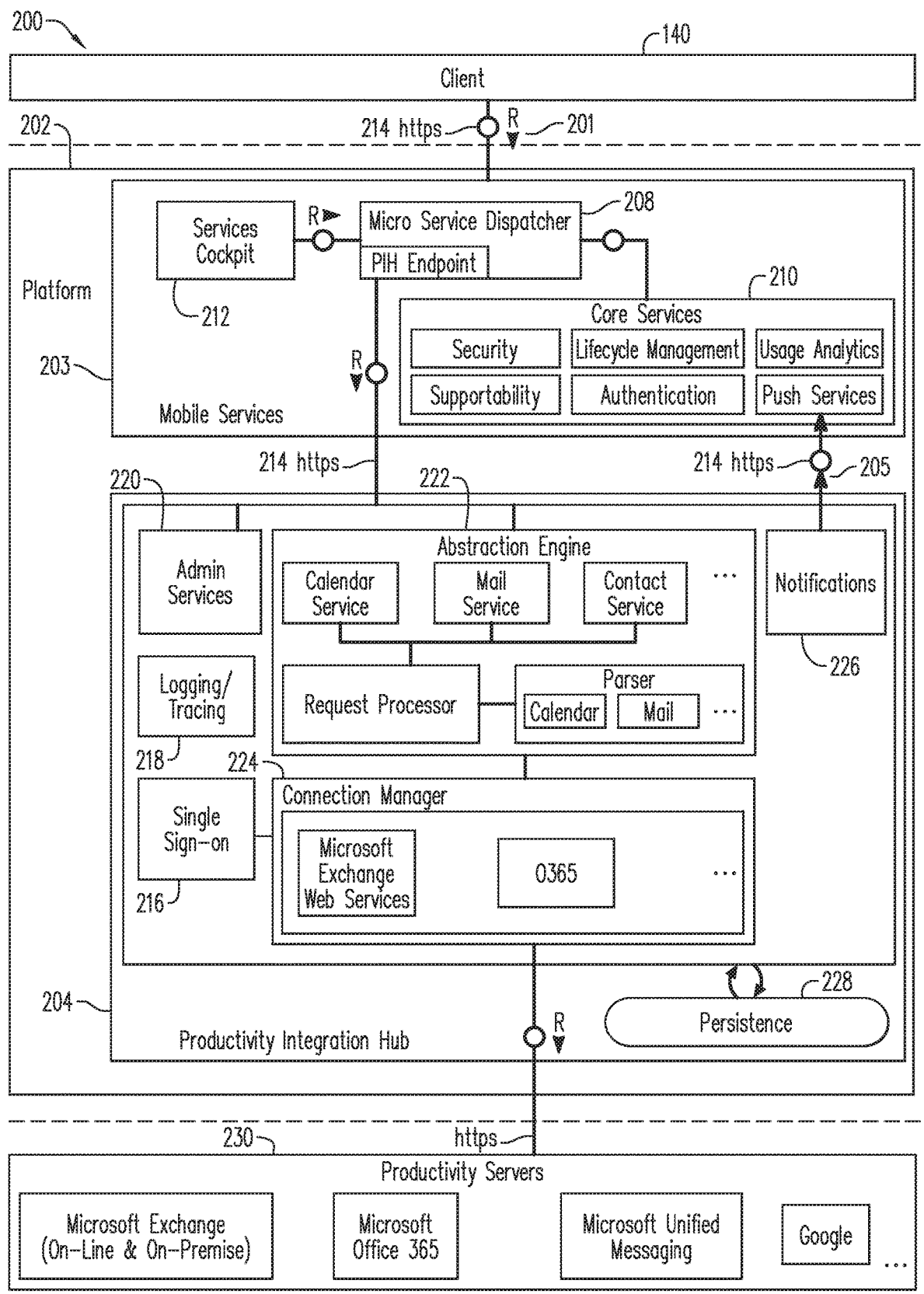
FIG. 2 is a block diagram of a system architecture according to some embodiments.
Figure 3:
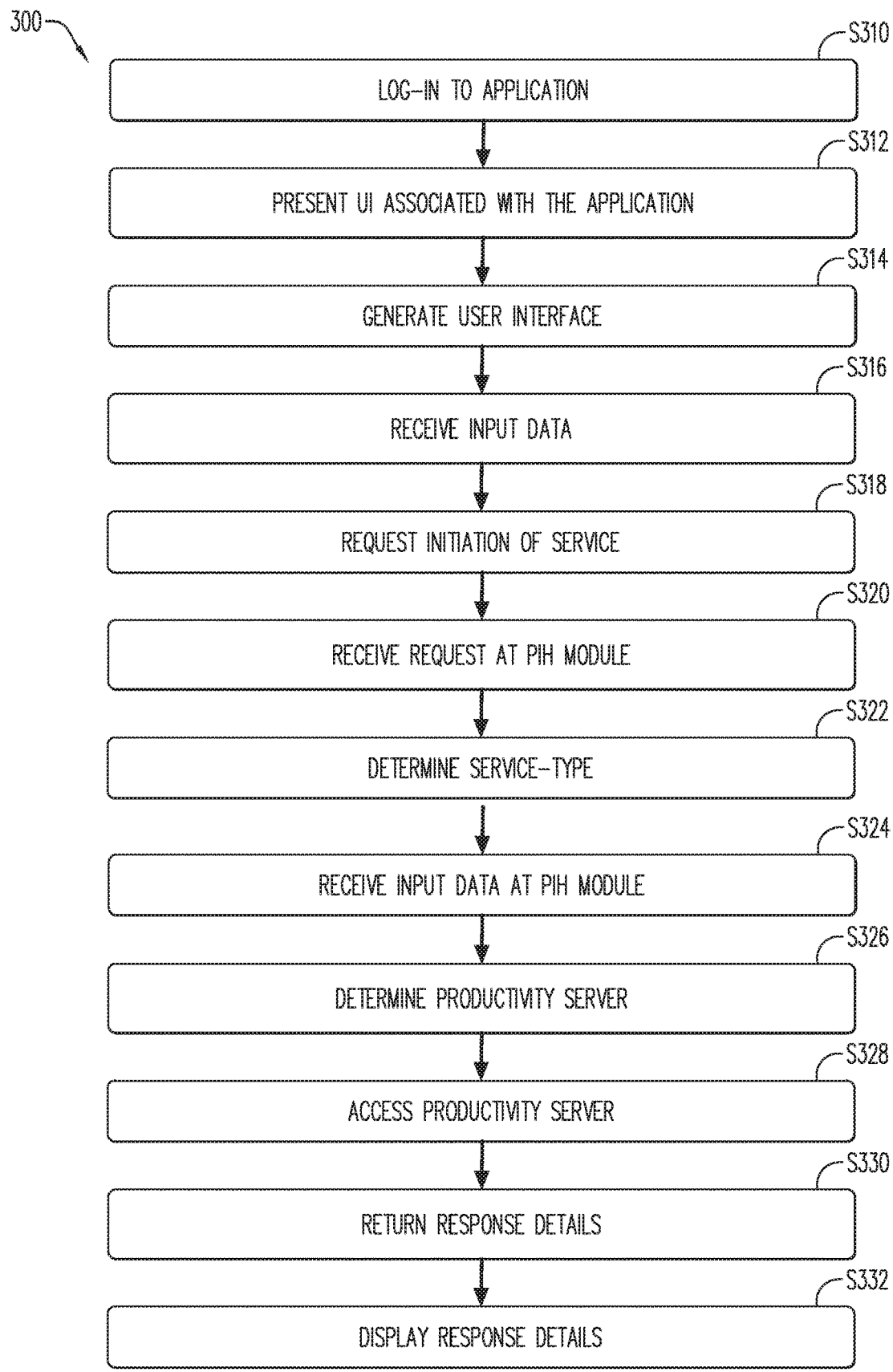
FIG. 3 is a flow diagram of a process according to some embodiments.
Figure 5:
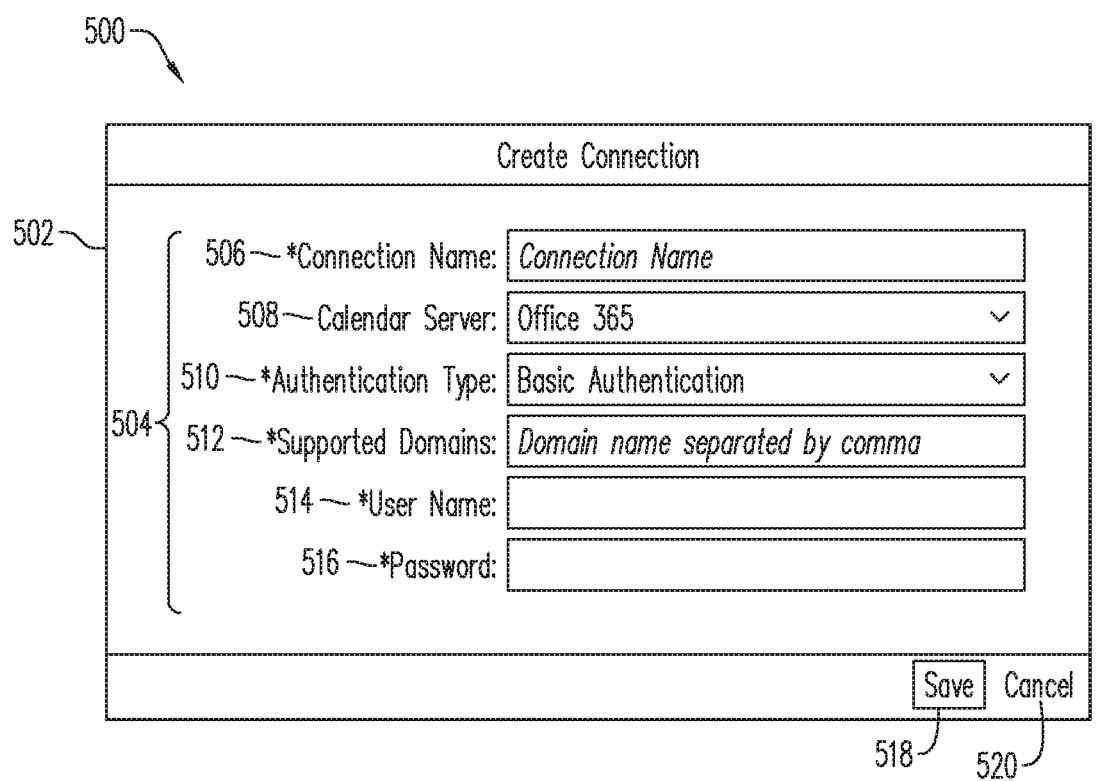
FIG. 5 is an outward view of a graphical interface according to some embodiments.
Figure 6:
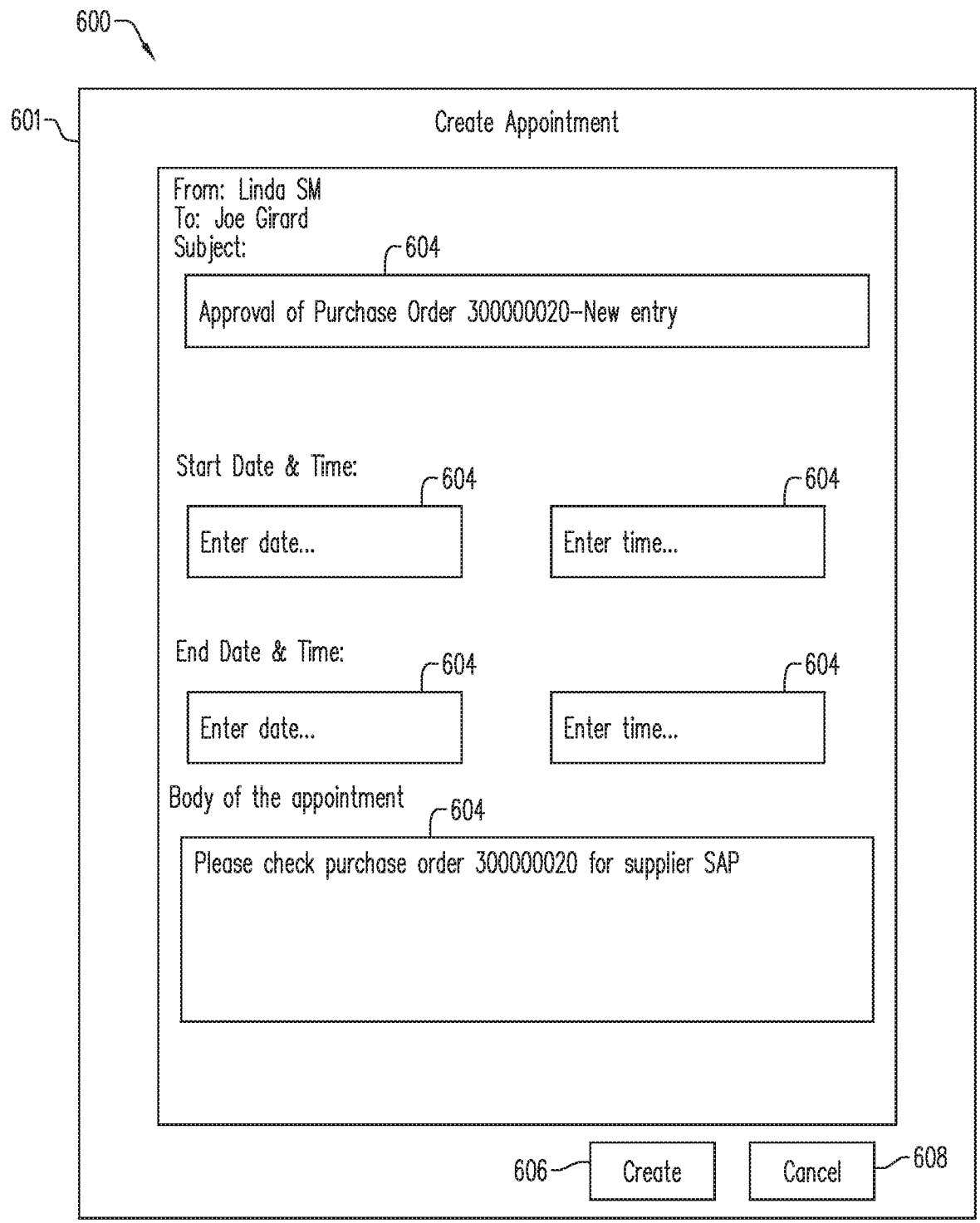
FIG. 6 is an outward view of a graphical interface according to some embodiments.

Architecture 100 includes database 110, database management system (DBMS) 120, application server 130, applications 135 and clients 140. The application server 130 may include a platform 202 (FIG. 2), such as the HANA Cloud Platform. Applications 135 may comprise server-side executable program code (e.g., compiled code, scripts, etc.) executing within application server 130 to receive queries from clients 140 and provide results to clients 140 based on data of database 110. One such application 135 may be an enterprise mobile application. Another application 135 may be a Productivity Integration Hub (PIH) module 204 (FIG. 2). Applications 135 executing within application server 130 may also provide user interfaces to an end user to facilitate the creation and application of a productivity service as described herein. These productivity services may be used by the aforementioned enterprise mobile application to present data to clients 140.

Application server 130 provides any suitable interfaces through which clients 140 (e.g., end user) may communicate with applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120 and database 110. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the enterprise mobile application example, database 110 may store end-user indicator information (e.g., an email address), request details, and productivity server information.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 140 may comprise one or more individuals or devices executing program code of a software application for presenting user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

FIG. 2 is a block diagram of system architecture 200 according to some embodiments. In one or more embodiments, the application server 130 described in FIG. 1 may belong to the cloud platform 202 ("the platform"). In one or more embodiments, the cloud platform 202 may be any suitable cloud platform 202.

The platform 202 may include an application services 203 and a Productivity Integration Hub (PIH) module 204. The application may be any suitable application (e.g., mobile, Customer Relationship Management (CRM) Application, Supplier Relationship Management (SRM) Application, Supply Chain Management Application). In a non-exhaustive example referred to below, the application may be an enterprise mobile application used to interact with customers, partners and a sales team, and may provide information about customers to the sales team/partners at any time in any location.

In one or more embodiments, the application services 203 (shown in FIG. 2 as "Mobile Services") may include a micro Service Dispatcher 208, one or more core services 210 and a services cock-pit 212. In one or more embodiments the core services 210 may include security, supportability, life-cycle management, authentication, usage analytics, and push services. Other suitable core services may be used.

In one or more embodiments, the application services 203 may be a web application that may be deployed as a Java application on the platform 202.

In one or more embodiments, the platform 202 may be used to develop and deploy cloud-based applications. The PIH module 204 may define how the services provided by the web applications will communicate and integrate with the platform 202 along with other common requirements like security, supportability and operations.

In one or more embodiments, and as described further below, the platform 202 may dispatch the incoming client request 201 to the PIH module 204 using a destination configured in the platform 202. In one or more embodiments, the client request 201 may be routed from the application through the mobile services and then to the PIH module 204. In one or more embodiments, the dispatching may be via an HTTPS channel 214 and the PIH module 204 may send a response 205 back via the same channel 214. In one or more embodiments, the response 205 may be provided in standard JSON format, or any other suitable format. In one or more embodiments, the application services 203 may validate and verify the incoming user request via the one or more core services 210. In one or more embodiments, the business data request validation may be via the PIH module 204.

In one or more embodiments, the PIH module 204 may include a bi-directional back-end integration framework that may provide services such as single sign-on 216 and logging/tracing 218; an administrative services module 220 that may enable connections to third-party services; an abstraction engine 222 to abstract and extend APIs for applications and/or services; a connection manager 224, a notification module 226 and a persistence module 228. In one or more embodiments, the PIH module 204 may provide a common API as an endpoint to the application 135 in order to interact with one or more productivity servers 230. While MICROSOFT EXCHANGE®, MICROSOFT OFFICE® 365, MICROSOFIT UNIFIED MESSAGING®, GOOGLE® 230 are shown in FIG. 2 as examples of productivity servers, any suitable productivity server may be used. In one or more embodiments, the API may be a representational state transfer (REST) API or any other suitable API (e.g., Simple Object Access Protocol).

In one or more embodiments, an administrator may configure connections to the various productivity servers 230 via the administrative services module 220 and the application services 203.

The inventors note that in one or more embodiments, the PIH module 204 may support: enterprise readiness (SSO, Security, Supportability); Manageability of multiple productivity services (e.g., integrate both MICROSOFT® and GOOGLE® services); Lifecycle management support (e.g., support different versions of productivity services; cloud based OFFICE 365®, on-premise EXCHANGE 2010®, EXCHANGE 2013®); and harmonized exposure of APIs (e.g., "abstracted" API, which allows connectivity to, for example, both MICROSOFT EXCHANGE® availability, GOOGLE CALENDAR® availability and other supported tools).

In terms of "single sign on" (SSO), it may refer to a user signed in to the mobile application with their corporate credentials may be able to get data from productivity integration servers (e.g., MICROSOFT 365® or GOOGLE CALENDAR®) without again keying in the credentials for the productivity integration server.

With regards to security, to enable end-to-end seamless connectivity, authentication flow may be broken into two parts. The first authentication may be at the application services 203 (e.g., based on trust configured in the Application Services cockpit 212). The second authentication may consider the end-user's email identification as a unique identifier for the target productivity server 230. The authentication may be categorized into Basic, OAuth (supported by most servers), and/or NTLM (for on-premise exchange servers), which may be based on administrative configuration. In one or more embodiments, successful authentication at two levels may satisfy the SSO and secure connectivity requirement.

Figure 7:
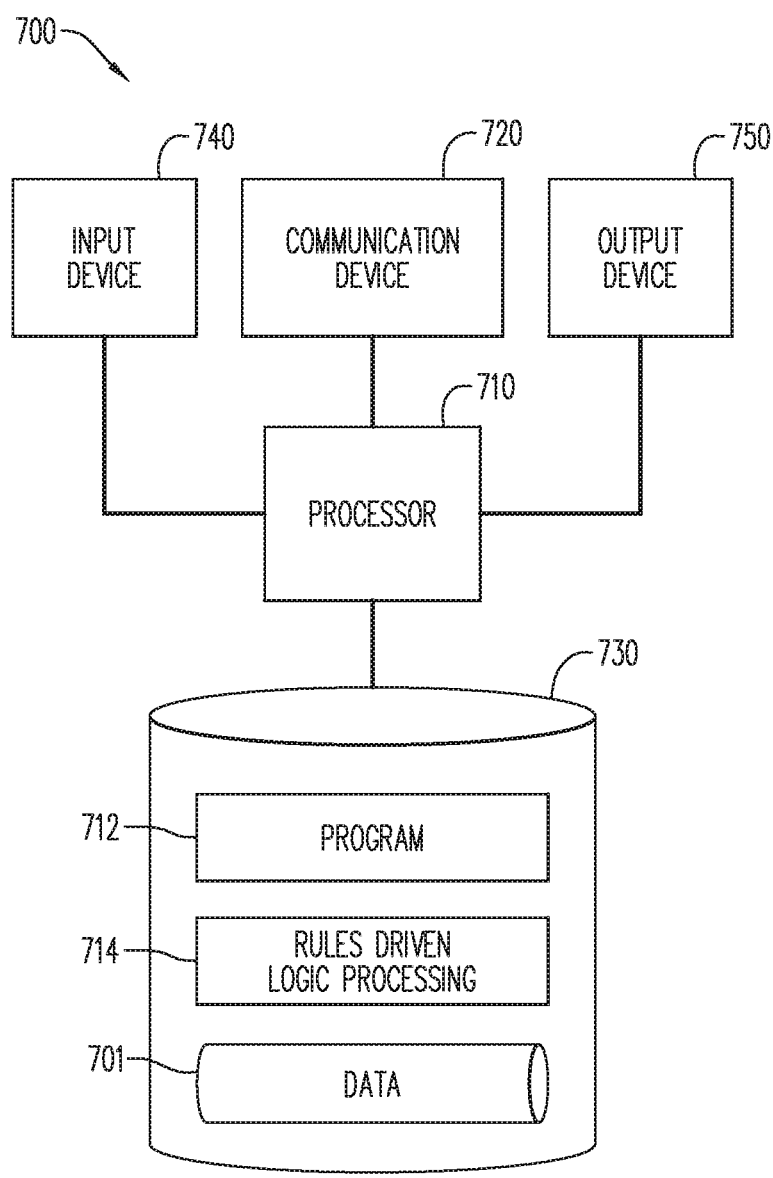
FIG. 7 is a block diagram of a system according to some embodiments.

In one or more embodiments, the Basic authentication may use Basic Impersonation to authenticate all of the user incoming requests. The request may be initiated by the end-user and may include authentication credentials (e.g., the end user id and password) in the request header. Then the PIH module 204 may send the credentials to the productivity server 230 to impersonate the end user and prompt a response to the request. In one or more embodiments, confidential information (e.g., username and password) may be stored in encrypted format in a storage 730 (FIG. 7). The inventors note that with impersonation, the rights of the request may not be elevated, rather, impersonation may be used to help the requestor (e.g., PIH module) login to the productivity server 230 with the end user's credentials. The productivity server 230 may deny/accept the request and then provide the necessary information. Additionally, impersonation may help the productivity server administrator provide an additional authorization layer and provide controlled access to the application. For example, the productivity server administrator may restrict the use by limiting the impersonation for a group of users.

In one or more embodiments, an OAuth authentication process may also include a request initiated by the end user, and may include the end user id and password. The inventors note that the terms "Client id" and "secret" may be used instead of "user id" and "password," respectively. Then the PIH module 204 may request data, and request an OAuth token via a client credential flow. The PIH module may receive the token based on the configuration provided by an administrative entity. After it receives the token, the PIH module 204 may impersonate the end user using the token and the end user request at the productivity server 230 may be made with the received OAuth token.

With regards to manageability of multiple productivity servers, in one or more embodiments, the abstraction engine 222 may generate a service-type specific API to the application developers, who may collect, via a user interface, the attributes needed for the API in the end user application they are developing for the productivity server. In one or more embodiment, the service-type specific API may be the same API for each application of a given service-type. In one or more embodiments, the application developer may provide the user interface associated with the productivity server to the end user, and invoke the common Abstracted Rest API (service-type specific API) to send the request to the Productivity servers and get a response. While different productivity servers 230 may provide different responses with different entity names for similar set data, the service-type specific API may include a common set of properties that may be provided as a response from the PIH module 204 to the end user. In one or more embodiments, the underlying details of those APIs may be abstracted from client users. For example, the common Abstracted Payload for Create Meeting Request may be:

```
{
    "start": "2015-07-29 08:00:00UTC",
    "end": "2015-07-29 08:40:00UTC",
    "organizer": {
        "emailAddress": "victorsm@pihub.onmicrosoft.com",
        "name": "Showkath"
    },
    "attendees": [
        {
            "emailAddress": "joe_girard_sm@pihub.onmicrosoft.com",
            "name": "Nitin Verma"
        }
    ]
}
```

The application developer who wants the end user to contact GOOGLE CALENDAR® may provide the above format, and the PIH module 204 may then convert it to the below format for the same request and send the request to the productivity server.

```
{
    "kind": "calendar#event",
    "creator": {
        "id": string,
        "email": string,
        "displayName": string,
        "self": boolean
    },
    "organizer": {
        "id": string,
        "email": string,
        "displayName": string,
        "self": boolean
    },
    "start": {
        "date": date,
        "dateTime": datetime,
        "timeZone": string
    },
    "end": {
        "date": date,
        "dateTime": datetime,
        "timeZone": string
    }
}
```

In one or more embodiments, the application developer who wants the end user to contact MICROSOFT®, may still send the payload as in the common payload described above, but the PIH module 204 may internally convert it to the below format for sending the request to the productivity server.

```
{
    "Start": {
        "DateTime": "2014-02-02T18:00:00",
        "TimeZone": "Pacific Standard Time"
    },
    "End": {
        "DateTime": "2014-02-02T19:00:00",
        "TimeZone": "Pacific Standard Time"
    },
```

-continued

```
    "Attendees": [
        {
            "EmailAddress": {
                "Address": "janets@a830edad9050849NDA1.onmicrosoft.com",
                "Name": "Janet Schorr"
            },
            "Type": "Required"
        },
        {
            "EmailAddress": {
                "Address": "jAlex@a830edad9050849NDA1.onmicrosoft.com",
                "Name": "Alex "
            },
            "Type": "Optional"
        }
    ]
}
```

As may be seen from these examples, the PIH module abstracts the common payload and then converts it to provide the appropriate request to the productivity server.

The API may not vary based on the productivity server 230, but the underlying implementation of authentication and connection to these productivity servers may change based on the administrative configuration. The inventors note that keeping the API the same irrespective of server change, may help organizations to easily switch over to different productivity servers without the need to change the service or client application implementation, so that end users will not be impacted by these changes. In one or more embodiments, the abstraction engine 222 may provide different parsers for each productivity server 230, but may provide common fields/entities to the application developers such that differences between the applications are supported (e.g., MICROSOFT®, meeting event has the "priority" as a field, but GOOGLE CALENDAR® does not provide such a field). In one or more embodiments, each server type may have its own abstraction classes, which may include parsers, adapters, and request validators.

Authentication for each productivity server 230 may differ from each other. Additionally, the underlying API for each productivity server, the endpoints, and the HTTP client version to connect the PIH module to each server may differ from each other. In one or more embodiments, an individual connection manager 224 for each productivity server 230 may connect the PIH module 204 to the various productivity servers. For example, in the case of Office 365, an Exchange Web Service (EWS) API may be used to interact with the Office 365 server. In one or more embodiments, the connection manager 224 may be invoked once the request object is created, and authentication object is filled with the required configuration. In one or more embodiments, the connection manager 224 may connect and validate the end user request to the productivity server 230.

In one or more embodiments, the persistence module 228 may provide tenant-specific schema which may store one or more runtime authentication configurations. For example, one or more databases may store configurations per tenant with specific connections. These configurations may not be shared or seen outside of those tenants (e.g., customers who subscribe to the mobile services and have authorization to use the PIH module.

In one or more embodiments, the logging/tracing service framework 218 may log each request, response and any other activity in the PIH module 204. In one or more embodiments, every log may be persisted in a tenant database and each tenant administrator may have access to the logs pertaining to usage of each service. The PIH module 204 may provide various APIs, which may be made available to an admin UI, where administrators may filter the logs based on different criteria.

In one or more embodiments, the notification module 226 may provide push notifications. Push notifications may provide a way to help the application 135 know of activities occurring in the productivity servers (e.g., calendar servers, document management servers, etc.) The push notification may be a response 205 to inform the end user of the activities that need their immediate attention.

In one or more embodiments, the administrative services module 220 may provide administrative API (e.g., REST API) back-end operations exposed to the administrative user interface shown in the application services cockpit 212.

In one or more embodiments, the administrative services module 220 may create a connection configuration which points to the appropriate productivity server 230. The configuration data may be used at runtime and may be stored in the database 110. In one or more embodiments, the connection configuration data values may be exposed, via API, in a format along with the connection mapping API. The administrative services module 220 may maintain a pool of such configurations, and may select one or more of the connections at an application level. In one or more embodiments, once the administrative services module 220 has configured these connections at the application level, end users who have a valid application connection ID may start interacting with the productivity servers 230. In one or more embodiments, where two connections are configured by the administrative services module 220 for the same application, interaction with the productivity servers 230 may be based on the domain name. In one or more embodiments, multiple users of the same application may have different domains configured via federation. As such, each connection may include Domain information. As further described below, when an end user makes a request, domain information from the email address may be analyzed, and the connection established to the productivity server based in part on the domain. In one or more embodiments, no two connections may have the same domain configuration.

FIG. 3-8 include a flow diagram of a process 300 (FIG. 3) described with respect to an outward view of user interface 400/500/600 according to some embodiments. Process 300 may be executed by application server 130 according to some embodiments, e.g., by execution of the enterprise mobile app 135 to provide a user with access to the user interface 400/500/600. In one or more embodiments, the application server 130 may be conditioned to perform the process 300, such that a processor 710 (FIG. 7) of the server 130 is a special purpose element configured to perform operations not performable by a general purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 400/500/600 may be presented on any type of display apparatus (e.g., desktop monitor, smartphone display, tablet display) provided by any type of client device (e.g., desktop system, smartphone, tablet computer). The application which is executed to provide user interface 400/500/600 may comprise a Web Browser, a standalone application, or any other application. Embodiments are not limited to user interface 400 of FIG. 4, user interface 500 of FIG. 5 or user interface 600 of FIG. 6.

As used herein, the term "smartphone" refers to any cellular phone that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets may typically come loaded with a web browser and a variety of applications ("apps").

Process 300 will be described with respect to FIGS. 3-7 per a fictional enterprise mobile application including the ability to create a meeting or appointment. In the particular non-exhaustive example, the sales manager using the mobile application may schedule a meeting with his/her sales team member(s) who are involved in processing an order. Conventionally, in a day-to-day activity, team members may not have a chance to switch to an email/calendar service (e.g., OUTLOOK®) to perform their daily tasks of scheduling meetings with involved parties, or anyone else. As described further below, embodiments provide the end user (e.g., sales manager/team member) to schedule meetings, reply to emails, synch emails, send emails, read attachments, create and send attachments without leaving the mobile application context. For example, to set up a meeting, the end user may select an option in the application to create an appointment with the member(s), and the associated calendar application may be launched. In one or more embodiments, the same API is called based on the service type (e.g., meeting request) regardless of the product (MICROSOFT®, GOOGLE®, LINKEDIN®, FACEBOOK®, etc.) or version (OFFICE 365®, OFFICE 2013®, OFFICE 2010®), the application is using, and a UI associated with the service is provided to the end user.

Prior to execution of process 300, an administrator may configure a given productivity server 230 with the PIH module 204 for Basic or OAuth authentication (FIG. 4). The create connection application may include one or more pages to enter information about the connection. The productivity server administrator may enable impersonation for service accounts. While a user account may be used, a service account may provide better security. When the administrator logs-in and opens to a PIH module admin portal, user interface 400 (FIG. 4) may be presented on a display 402 with a plurality of user-entry fields 404. The user-entry fields 404 may include a connection name 406, a service server (e.g., for a calendar productivity server, Office 365) 408, an authentication type (e.g., Basic or OAuth) 410, supported domains (e.g., NDA1.onmicrosoft.com, gmail.com, <companyname>.com) 412, as shown here, multiple domains may be provided and separated by commas, Client ID 414, Authority, where the authority is the OAuth 2.0 end point URL (e.g., https://oauthservices<domain url>/oauth2/api/v1/token) 416, URL 418, Certificate Alias (e.g., Office 365) 420, Keystore Location (e.g., MSKeyStore.jks) 422, and Keystore password 424. As used herein, the Keystore may be a secure location in a cloud platform where the certificate may be stored. There may be multiple certificates stored in the same Keystore location 422. In one or more embodiments, in the case of more than one certificate being stored in the Keystore location, a certificate alias 420 may be used as a unique identifier of a certificate in the Keystore. In one or more embodiments, the Keystore certificate may be uploaded and/or deleted. The administrator may then select one of a save indicator 426 or cancel indicator 428 to save the connection or cancel the connection set-up, respectively.

After the productivity server 230 is configured for authentication, one or more connections may be configured between the PIH module 204 and the productivity server 230. The administrator may log-in to the PIH module 204, and may select an application from a navigation UI (not shown) to create a connection on the PIH module 204. Then a user interface 500 (e.g., Create Connection window) (FIG. 5) may be presented on a display 502 with a plurality of user-entry fields 504. The administrator may enter connection details (e.g., connection name 506 and productivity server-type 508), authentication type 510 (e.g., Basic or OAuth), and required credentials (e.g., supported domains 512, user name 514, password 516). In one or more embodiments, multiple domains may be provided in the "Supported Domains" user-entry field 504, separated by commas. The administrator may then select one of a save indicator 518 or cancel indicator 520 to save the connection or cancel the connection set-up, respectively.

In one or more embodiments, in addition to creating/configuring connections of an application on the PIH module 204, the administrator may map an existing PIH server connection to an application. For example, the administrator may select an application from the navigation UI, select a "configure" option, and choose connections to be mapped. The selections may be confirmed by selection of a confirm indicator (not shown), in one or more embodiments. In response, connections may be mapped to the selected application.

In one or more embodiments, the administrator may edit and/or delete an existing PIH server connection to the application. The changes made to connection properties may be applied to all mappings that are associated with the connection, in one or more embodiments. For example, when a connection is deleted, all mappings associated with the connection may be removed. When a connection is deleted, it may be unmapped from the application, and may no longer be visible under an Application-specific connection in a UI.

Initially at S310, an end user logs-in to the application 135. While the application described herein is a mobile application used to process an order, any suitable application may be used. Continuing with the example introduced above, Linda, the Sales Manager, logs-in to the order application and receives a notification that no action has been taken on the Order for the last ten days. She then pulls up the order details and realizes that she needs to have a meeting with Joe about the order. She then creates a meeting request instantly, via the PIH module 204, without having to move out of the mobile application context, as described further below.

In S312, a user interface (not shown) associated with the application is presented on a display. In one or more embodiments, this UI may be to initiate a request to set up the meeting. The user interface may include a plurality of user-entry fields to request a service (e.g., calendar, electronic mail, chat, etc.) associated with the application. For example, the calendar application may include a meeting request service.

In one or more embodiments, based on a determined service-type, the PIH module 204 may generate and present a service-type specific API, which the application developer uses to generate a user interface 600 (FIG. 6) to display to the end user in S314. In one or more embodiments, the service-type specific user interface 600 may be based on a service-type specific payload, irrespective of the productivity server that may be accessed to execute the request. For example, when the service-type is to create a meeting, the API call and the request payload may remain the same whether the application would like to create the meeting with MICROSOFT OFFICE 365 CALENDAR®, MICROSOFT EXCHANGEON PREMISE CALENDAR® OR GOOGLE CALENDAR SERVICES®. In one or more embodiments, specific HTTP headers may be used for all PIH Rest API calls. For example, X-SMP-APPCID communicates the application connection ID that is generated by the application from which the request originates, or as issued by the server; X-SMP-PIH-REQUESTOR communicates the email address of the requestor; AUTHORIZATION communicates credentials of the authentication type that is configured between the client application and mobile services platform. With respect to create a meeting service type, the Request may have a URL (e.g., https://<hcpms-tenant:port>/mobileservices/premium/ProductivityHub/1/calendar/meeting), with the HTTP Method: Post. In one or more embodiments, the request may include one or more optional request parameters (e.g., attendees can see others, guests can invite others to the meeting, category of meeting) and one or more mandatory request parameters (e.g., details on attendees, email address of attendee). Other suitable parameters may be included).

In S316, the end-user may input data into the one or more displayed user-entry fields 604 and submit the data. In the example shown herein, the end-user may input a subject, a start date and time, an end date and time, and may include any comments related to the appointment. Other suitable user-entry fields may be used. The end user may then request initiation of the service in S318 via selection of one of a create 606 or cancel indicator 608 to submit the data to create the appointment or cancel the creation of the appointment, respectively. In one or more embodiments, from within the application 135, an appropriate API may be called to execute the service. Continuing with the example, Linda requests the initiation of a meeting request.

The request may be received by the PIH module 204 in S320. Then in S322, the PIH module 204 may determine a service-type associated with the request. In one or more embodiments, the PIH module 204 may determine the service-type based on data stored in a memory 730.

In one or more embodiments, the application developer may customize the payloads to give a different set of options in the end user application to match the application developer requirements, which in turn may point to the different optional attributes in the payload. In one or more embodiments, attributes that are "optional" may be customizable. Examples of optional attributes may include excluding conflicts, type of attendee, details of the freebusy view of attendees, time between consecutive minutes, type of freebusy view, maximum group members, meeting duration, suggested meeting times as well. For example, in one or more embodiments, including details of the attendee and an email address of the attendee may be mandatory, while including an option to get suggestions for meeting times/appointments or including a percentage of attendees who must be free for the requested time period to qualify as a suggested meeting time may be optional. Other examples of mandatory attributes may include availability of a user, meeting window date and time, organizer details, and organizer email address. Other suitable attributes may be mandatory. In one or more embodiments, if the payload includes an optional attribute, the payload may be valid even without the optional attribute. In one or more embodiments, it may be the application developer discretion to present this attribute to the end users in the UI.

In one or more embodiments, after the input data is submitted, via the API, it is received at the PIH module 204 in S324. In one or more embodiments, the received data may also include data in an HTTP header, as part of the REST API. In one or more embodiments, the received data may include a connection ID that is generated by the application from which the request originates, or is issued by the server. In one or more embodiments, the connection ID may be unique for the application it is associated with. In one or more embodiments, the connection ID may be sent to the PIH module 204 for all subsequent requests. The received data may also include an email address of the requestor, and the credentials of the authentication type that is configured between the application and the platform.

Then in S326, the PIH module 204 determines which productivity server 230 to send the received data to. In one or more embodiments, the abstraction engine 222 of the PIH module 204 may analyze the data in the HTTP header to determine an appropriate productivity server 230 to respond to the request for service.

Then in S328, the PIH module 204 accesses the determined productivity server 230 to satisfy the request for service. In one or more embodiments, the PIH module 204 may impersonate the end user to the productivity server 230. As used herein, "impersonate" refers to the PIH module 204 using the end user credentials (e.g., email address/password) to authorize and authenticate the PIH module 204 to the productivity server, and ultimately access the productivity server as the end user. The productivity server 230 returns one or more response details 205 to the PIH module 204 based on the rights of the end user being impersonated in S330. In S332, at least one of the one or more response details are displayed on the display. In one or more embodiments, the response details may include an indication the request was executed, and any other suitable details. In one or more embodiments, in the Response payload, when a response code is appropriate, then only the response may be successfully accepted by the application. For example, 201 may be the status code for Create meeting request; 200 may be the status code for Get meeting request; and 204 may be the status code for Delete. Continuing with the meeting request example, the response details may include the following message: "meeting successfully created." In one or more embodiments, the response details may also add the meeting to the Calendar of the respective participants, on accepting the meeting request, in the appropriate location, via the PIH module 204. In one or more embodiments, when the end user selects the "create" indicator 606, the appointment is created in the appropriate productivity server and is visible not only in the application 135 (e.g., mobile application), but also in the Calendar service application (e.g., Outlook), for example. Further, in one or more embodiments, if any updates are done directly in Calendar, the changes may also be reflected in the application. In one or more embodiments, the change may be reflected after selection of a "sync" indicator.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 100. Apparatus 700 may include other unshown elements according to some embodiments.

Apparatus 700 includes PIH processor 710 operatively coupled to communication device 720, data storage device/memory 730, one or more input devices 740, and one or more output devices 750. Communication device 720 may facilitate communication with external devices, such as application server 130. Input device(s) 740 may comprise, for example, a keyboard, a keypad, a mouse or other pointing device, a microphone, knob or a switch, an infrared (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc.

The storage device 730 stores a program 712 and/or PIH platform logic 714 for controlling the processor 710. The processor 710 performs instructions of the programs 712, 714, and thereby operates in accordance with any of the embodiments described herein, including but not limited to process 300.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a display;
   a memory storing processor-executable steps;
   a Productivity Integration Hub (PIH) module; and
   a processor to execute the processor-executable process steps to cause the system to:
   based on a service-type associated with a service request for a service, generate a service-type specific user interface on the display, the service-type specific user interface associated with an end-user application and including one or more user-entry fields to receive data pertaining to the service request, wherein the service-type specific user interface is based on a service-type specific payload abstracted by a service-type specific Application Programming Interface (API) of the PIH module, and wherein the service-type specific API is common for each end-user application of a given service-type;
   receive input data in the one or more displayed user-entry fields of the service-type specific user interface;
   receive the input data at the PIH module via the service-type specific API;
   determine, by the PIH module, a service-type based on the received input data;
   determine, by the PIH module, a productivity server of a plurality of productivity servers to receive the input data;
   abstract, by the PIH module, the service-type specific payload from the received input data;
   convert, via the PIH module, the service-type specific payload to a format receivable by an underlying API of the determined productivity server;
   access the determined productivity server via the PIH module using the underlying API of the determined productivity server;
   return one or more response details to the PIH module from the accessed productivity server; and
   display on the user interface at least one of the one or more response details received from the PIH module.

2. The system of claim 1, wherein the end-user application is associated with a service provided by the accessed productivity server.

3. The system of claim 2, wherein the processor further executes the processor-executable process steps to cause the PIH module to:
   authorize an end user's access to the service; and
   authenticate the end-user's access to the service.

4. The system of claim 3, wherein the service-type specific payload is common to a service-type irrespective of the accessed productivity server.

5. The system of claim 3 wherein the processor further executes the processor-executable process steps to cause the PIH module to, after receipt of the input data to the service-type specific user interface:
   access the determined productivity server by sending an electronic mail address of an end user to the productivity server.

6. The system of claim 3, wherein the service-type is one of an electronic mail, a calendar, a chat.

7. A computer-implemented method comprising:
   based on a service-type associated with a service request for a service, generating a service-type specific user interface on a display, the service-type specific user interface associated with an end-user application and including one or more user-entry fields to receive data pertaining to the service request, wherein the service-type specific user interface is based on a service-type specific payload abstracted by a service-type specific Application Programming Interface (API) of a Productivity Integration Hub (PIH) module, and wherein the service-type specific API is common for each end-user application of a given service-type;
   receiving input data in the one or more displayed user-entry fields of the service-type specific user interface;
   receiving the input data at the PIH module via the service-type specific API;
   determining, by the PIH module, a service-type based on the received input data;
   determining, by the PIH module, a productivity server of a plurality of productivity servers to receive the input data;
   abstracting, by the PIH module, the service-type specific payload from the received input data;
   converting, via the PIH module, the service-type specific payload to a format receivable by an underlying API of the determined productivity server;
   accessing the determined productivity server via the PIH module using the underlying API of the determined productivity server;
   returning one or more response details to the PIH module from the accessed productivity server; and
   displaying on the user interface at least one of the one or more response details received from the PIH module.

8. The method of claim 7, further comprising:
   authorizing and authenticating an end-user's access to the service via the PIH module.

9. The method of claim 8, wherein the service-type is one of an electronic mail, a calendar, a chat.

10. The method of claim 7, wherein the PIH module impersonates the end-user to the determined productivity server to access the determined productivity server.

11. The method of claim 7, wherein the input data received at the PIH module includes an end-user identifier and an application identifier.

12. The method of claim 11, wherein the end-user identifier is an electronic-mail address associated with an end user.

13. A non-transitory computer-readable medium storing program code, the program code executable by a computer system to cause the computer system to:
   based on a service-type associated with a service request for a service, generate a service-type specific user interface on a display, the service-type specific user interface associated with an end-user application and including one or more user-entry fields to receive data pertaining to the service request, wherein the service-type specific user interface is based on a service-type specific payload abstracted by a service-type specific Application Programming Interface (API) of a Productivity Integration Hub (PIH) module, and wherein the service-type specific API is common for each end-user application of a given service-type;
   receive input data in the one or more displayed user-entry fields of the service-type specific user interface;
   receive the input data at the PIH module;
   determine, by the PIH module, a service-type based on the received input data;
   determine, by the PIH module, a productivity server of a plurality of productivity servers to receive the input data;
   abstract, by the PIH module, the service-type specific payload from the received input data;

convert, via the PIH module, the service-type specific payload to a format receivable by an underlying API of the determined productivity server;

access the determined productivity server via the PIH module using the underlying API of the determined productivity server;

return one or more response details to the PIH module from the accessed productivity server; and display on the user interface at least one of the one or more response details received from the PIH module.

* * * * *